US012720317B2

(12) United States Patent
Mariyani et al.

(10) Patent No.: US 12,720,317 B2
(45) Date of Patent: Aug. 25, 2026

(54) METHODS AND SYSTEMS FOR INTERCEPTING USER ACTIVITIES

(71) Applicant: T-Mobile USA, Inc., Bellevue, WA (US)

(72) Inventors: Anil Kumar Mariyani, Ashburn, VA (US); Anuj Sharma, Broadlands, VA (US); Kashyap Patel, Olathe, KS (US); Henry Ha, Covington, WA (US)

(73) Assignee: T-Mobile USA, Inc., Bellevue, WA (US)

(*) Notice: Subject to any disclaimer, the term of this patent is extended or adjusted under 35 U.S.C. 154(b) by 376 days.

(21) Appl. No.: 17/752,535

(22) Filed: May 24, 2022

(65) Prior Publication Data

US 2023/0388805 A1 Nov. 30, 2023

(51) Int. Cl.

| | |
|---|---|
| ***H04W 12/80*** | (2021.01) |
| ***H04L 67/50*** | (2022.01) |
| ***H04L 67/53*** | (2022.01) |
| ***H04W 8/02*** | (2009.01) |

(52) U.S. Cl.

CPC ............. *H04W 12/80* (2021.01); *H04L 67/53* (2022.05); *H04L 67/535* (2022.05); *H04W 8/02* (2013.01)

(58) Field of Classification Search

CPC ........ H04W 12/80; H04W 8/02; H04L 67/53; H04L 67/535

USPC ............................................................... 726/3

See application file for complete search history.

(56) References Cited

U.S. PATENT DOCUMENTS

| | | | | |
|---|---|---|---|---|
| 10,447,503 | B2 * | 10/2019 | Grootwassink | H04W 28/12 |
| 2009/0006414 | A1 * | 1/2009 | Imbimbo | H04W 12/80 |
| 2009/0064313 | A1 * | 3/2009 | Zampiello | H04L 63/08 726/17 |
| 2011/0269430 | A1 * | 11/2011 | Di Donato | H04L 63/306 455/412.2 |
| 2013/0057388 | A1 * | 3/2013 | Attanasio | G06Q 50/26 340/10.1 |
| 2017/0164165 | A1 * | 6/2017 | Negalaguli | H04W 12/033 |
| 2018/0205763 | A1 * | 7/2018 | Seetharaman | H04L 63/30 |
| 2020/0213839 | A1 * | 7/2020 | Truchan | H04L 9/0869 |
| 2020/0351616 | A1 * | 11/2020 | Vanderveen | H04W 12/03 |
| 2021/0067955 | A1 * | 3/2021 | Rao | H04L 63/306 |

* cited by examiner

*Primary Examiner* — Jacob Lipman
(74) *Attorney, Agent, or Firm* — Lee & Hayes, P.C.

(57) ABSTRACT

Methods and systems for reporting a provisioning transaction in a wireless communication network are disclosed. According to an implementation, a lawful interception management system (LIMS) of the wireless communication network may receive, from a law enforcement agency (LEA), a request to track activities of a subscriber of services provided through the communication network. The request may be submitted through a third-party server located in a public network. LIMS may transmit the request to a communication service provider (CSP). Upon receiving the request, CSP may forward the request to one or more servers via dedicated interfaces respectively assigned. The one or more servers may be configured to intercept the provisioning transactions that occurred on different radio access networks, e.g., 2G/3G, 4G/LTE, or 5G. Once the provisioning transaction is intercepted, LIMS may be immediately notified via the dedicated interfaces. Information related to the provisioning transactions is reported to LEA.

20 Claims, 6 Drawing Sheets

METHODS AND SYSTEMS FOR INTERCEPTING USER ACTIVITIES

BACKGROUND

User activities in wireless communication networks nowadays can be traced, tracked, and recorded. Activities such as making phone calls, texting, and using data service generate signaling intercepted information of the users, which is sent to a lawful interception management system (LIMS) to store in a local database. However, other activities such as SIM card swap, mobile number change, service change, etc., are provisioning transactions that do not generate signaling intercepted information. Information related to the provisioning transactions are only written to the user data management systems based on the services that the user has subscribed to but are not forwarded to LIMS. Thus, when a law enforcement agency (LEA) sends a request to LIMS to track user activities in the wireless communication network, information related to the provisioning transactions of the user cannot be obtained from LIMS and shared with LEA.

Some critical provisioning transactions change the information related to the user identity such as, phone number, SIM card number, etc. In circumstances, a user's mobile phone number may have changed prior to LEA sending a request to track activities related to that number. As neither LEA nor LIMS is aware of the change, the request is distributed to one or more servers in the network to track the activities associated with the old mobile phone number. As a result, the user activities being shared with LEA is only related to the old mobile phone number.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
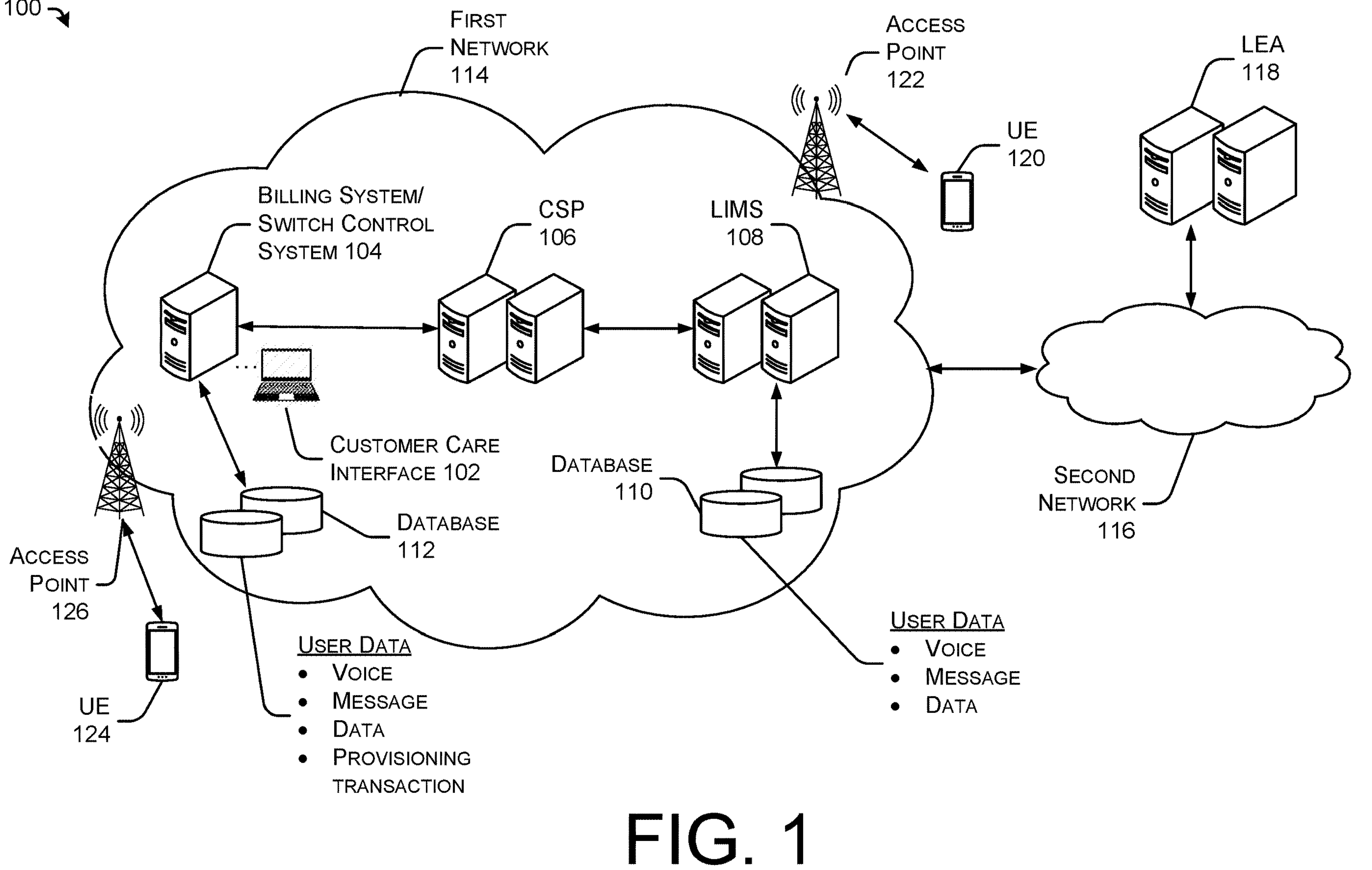
FIG. 1 illustrates an exemplary network scenario, in which methods for intercepting user activities are implemented.

Techniques for intercepting user activities in a wireless communication network are discussed herein. In some implementations, a method for implementing provisioning transactions reporting may be implemented on a server device located in a wireless communication network, including but not limited to a lawful interception management system (LIMS) and/or a communication service provider (CSP). The wireless communication network may include any wireless operators' private networks such as T-Mobile, AT&T, Sprint, Verizon, etc. The server device may maintain the information of the subscribers of the wireless communication network. Such information may include the subscriber registration information, identity information, voice activities, text message history, data activities, billing information, etc. A law enforcement agency (LEA) may send a request to LIMS to track activities of a target subscriber. In some examples, the request may be sent through a third-party server located in a public network. Upon receiving the request, LIMS may forward the request to CSP. CSP, acting as a triage center, may further forward the request to one or more data management servers in the wireless communication network. CSP may generate dedicated interfaces to transmit information related to the provisioning transactions between the one or more servers and LIMS. When a provisioning transaction is intercepted by the one or more data management servers, LIMS is immediately notified. The information related to the intercepted provisioning transaction is forwarded to LEA timely.

In some implementations, in addition to the provisioning transactions, the user activities may also include voice service activities of the subscriber, short message service activities of the subscriber, multimedia message service activities of the subscriber, data service activities of the subscriber, etc. In some examples, the voice activities may include but are not limited to the destination number, IP address of the UE when a voice call is initiated, the type of UE being used for the voice call, a duration of the voice call, access point information when the voice call is established, changes of the access point and/or the IP address of the UE during the voice call if any, etc. Short message service activities and/or multimedia message service may include the destination number, IP address of the UE when using the short message service activities and/or multimedia message service, the type of UE being used, text message usage, the link to the video shared in the multimedia message, etc. Data service activities may include an http address of a website visited by the subscriber, the dwell time on the website, actions the subscriber performed on the website (e.g., login to check bank account, make a purchase, watch a video, etc.), http addresses of one or more other websites visited from the website, etc.

In some implementations, the provisioning transactions include at least one of changing international mobile subscriber identity (IMSI) of the subscriber, changing mobile station integrated services digital network (MSISDN) of the subscriber, changing the subscribed services, activating a new subscriber, suspending a subscriber, restoring a suspended subscriber, deactivating a subscriber, sending cancel location to VLR (Visitor Location Register)/MME (Mobility Management Entity)/AMF (Access and Mobility Function), lock IMSI/IMEI (International Mobile Equipment Identity), unlock IMSI/IMEI, etc.

In some implementations, the one or more data management servers in the wireless communication network may include but not limited to a home location register (HLR) configured to intercept the provisioning transactions occurred in 2G/3G network, a home subscriber server (HSS) configured to intercept the provisioning transactions occurred in 4G/LTE network, or a unified data management (UDM) configured to intercept the provisioning transactions occurred in 5G network, a SBC (session border control)/P-CSCF (Proxy-Call Session Control Function) configured to intercept the voice activities occurred in LTE/4G network, a PGW (PDN gateway)/SMF (session management function)/UPF (user plane function) configured to intercept the voice activities occurred in 5G network, etc.

In some implementations, when one or more of the HLR, HSS, or UDM intercepts a provisioning transaction, the information may be immediately reported to LIMS through the dedicated interface to be shared with LEA.

In some implementations, upon receiving an intercepted provisioning transaction, LIMS may update the request to track the activities of the target subscriber based on the intercepted provisioning transactions. By providing the dedicated interfaces to report the intercepted provisioning transactions, the present disclosure provides efficient solutions to enhance the functionality of LIMS and/or CSP such that the subscriber's activities can be accurately captured and timely reported.

In some implementations, the techniques discussed herein may be implemented in a computer network using one or more of protocols including but are not limited to Ethernet, 3G, 4G, 4G LTE, 5G, or any combination thereof. In some examples, the network implementations may support standalone architectures, non-standalone architectures, dual connectivity, carrier aggregation, etc. Example implementations are provided below with reference to the following figures.

FIG. 1 illustrates an exemplary network scenario, in which methods for intercepting user activities are implemented.

As illustrated in FIG. 1, the network scenario 100 may include a first network 114 that acts as an internal network of a wireless service provider such as, T-Mobile, AT&T, Sprint, Verizon Wireless, etc. The first network 114 may include various access points (e.g., access point 122, access point 126, etc.) that are compatible with one or more radio access technologies, wireless access technologies, protocols, and/or standards, such as 5G NR technology, LTE/LTE Advanced technology, other Fourth Generation (4G) technology, High-Speed Data Packet Access (HSDPA)/Evolved High-Speed Packet Access (HSPA+) technology, Universal Mobile Telecommunication System (UMTS) technology, Code Division Multiple Access (CDMA) technology, Global System for Mobile Communications (GSM) technology, WiMAX technology, Wi-Fi technology, and/or any other previous or future generation of radio access technology.

The access points (i.e., access point 122 and access point 126) may be any type of base stations that communicate with a plurality of user equipment (UE), e.g., UE 120, UE 124, etc. In some examples, the access points may include 2G base stations and/or 3G Node Bs that are associated with GSM and CDMA access network. In some examples, the access points may include eNBs that are associated with an LTE access network known as an Evolved UMTS Terrestrial Radio Access Network (E-UTRAN). In some examples, the access points may include gNBs or as new radio (NR) base stations that are associated with a 5G access network. The access points may connect to the first network 114 via various interfaces for transmission of user data and/or control data.

The UE (i.e., UE 120 and UE 124) may be any device that can wirelessly connect to a telecommunication network. In some examples, the UE may be a mobile phone, such as a smart phone or other cellular phone. In other examples, the UE may be a personal digital assistant (PDA), a media player, a tablet computer, a gaming device, a smart watch, a hotspot, a personal computer (PC) such as a laptop, desktop, or workstation, or any other type of computing or communication device. In yet other examples, the UE may include the computing devices implemented on the vehicle including but are not limited to, an autonomous vehicle, a self-driving vehicle, or a traditional vehicle capable of connecting to internet. In yet other examples, the UE may be a wearable device and/or wearable materials, such as a smart watch, smart glasses, clothes made of smart fabric, etc. It should be appreciated that the examples of UE discussed herein are merely for illustrative purposes. The present disclosure is not intended to be limiting. Any objects that are configured with communication capabilities to connect to the Internet can be used as the user equipment.

A user may subscribe to a plurality of services provided through the first network 114 such as voice service, short message service, data service, etc. The activities of the user (also referred to as subscriber) can be detected by the various access points of the first network 114 when the subscriber performs one or more operations using one or more UEs. These operations include but are not limited to, making a phone call, sending a text message, sending a video message, browsing a website, launching a mobile app, and/or using other data services, changing SIM card, changing subscriber number, changing data services. Activities associated with a particular subscriber can be tracked via the access points (e.g., access point 122 and access point 126) and the information related to these activities is transmitted to one or more user data management systems, for example, the billing system/switch control system 104.

In some examples, the billing system/switch control system 104 is configured to define the policies, processes, and rates that the service provider relies on to invoice the subscribers for their subscribed services and/or products. The billing system/switch control system 104 may also perform switch control based at least in part on the service changes associated with the subscriber. For example, for a pre-paid subscriber, the billing system/switch control system 104 may monitor the usage of the call service, the text service, and/or the data service and update the remaining balance of the pre-paid subscriber. In some examples, the subscriber may travel to a different location where 5G data service is unavailable. The billing system/switch control system 104 may switch the subscriber's device to a different access point compatible with 2G, 3G, or LTE radio access technology.

In some examples, the billing system/switch control system 104 is configured to manage the non-signaling transactions performed through a customer care interface 102. While call service, text service, and data service can be automatically detected at the access points when the subscriber makes a phone call, sends a text message, or uses data service, non-signaling transactions do not generate signaling intercepted information and cannot be captured at the access points. The non-signaling transactions, also referred to as provisioning transactions, may be handled by the customer care interface 102 communicatively connected to the billing system/switch control system 104. In some examples, the customer care interface 102 may be real-person customer service to whom the user can talk via the phone. In some other examples, the customer care interface 102 may be a customer service tool implemented on the provider's website and/or the provider's app. In yet another example, the customer care interface 102 may be a customer service texting tool, through which, the user can communicate via texting.

For example, to activate a new subscriber, after receiving the device (e.g., UE 120 or UE 124), the user may visit the provider's website and follow the activation instructions through a customer care tool implemented on the provider's website. Alternatively, the user may communicate with a customer care person via a phone call or text messages to activate the device. In some examples, the user may need to talk to the customer care person on the phone or via text messages to swap SIM card, add a new SIM card, change the phone number, change the service, etc.

Some critical provisioning transactions discussed herein may include but not limited to the operations to activate a new subscriber, IMSI (International Mobile Subscriber Identity) change, MSISDN (Mobile Station Integrated Services Digital Network) change, suspend a subscriber, restore a suspended subscriber, deactivate a subscriber, send cancel location to VLR (Visitor Location Register)/MME (Mobility Management Entity)/AMF (Access and Mobility Function), lock IMSI/IMEI (International Mobile Equipment Identity), unlock IMSI/IMEI, etc.

In general, signaling intercepted user activities (i.e., phone call, text message, data service, etc.) are stored in one or more databases connected to the first network 114. When the signaling intercepted user activities are detected, information related to these activities are stored in the database 112 connected to the billing system/switch control system 104. The information is also forwarded a lawful interception management system (LIMS) 108 to be stored in a local database, i.e., database 110. In circumstances, a law enforcement agency (LEA) 118 may send a request through a second network 116 to the LIMS 108 to intercept the activities of a target subscriber in the first network 114. Upon receiving the request, the LIMS 108 may search the data records stored in the database 110 and send the signaling intercepted activities of the target subscriber to the LEA 118.

However, in current implementation, the information related to the provisioning transactions can be saved only in the database 112 connected to the billing system/switch control system 104 but is not forwarded to the LIMS 108. When the LIMS 108 responds to the request of the LEA 118, the information related to the provisioning transactions of the target subscriber is missing. Particularly, if some critical information of the target subscriber has changed but not reported to LIMS 108 (e.g., IMSI change, MSISDN change, etc.), LEA may send the request associated with a target subscriber without knowing that the phone number of the target subscriber has changed. The information later being shared with LEA is related to an out-of-date mobile phone number, causing the tracking unsuccessful. To solve this, the present disclosure provides solutions to enhance the functionality of the LIMS 108 and/or the CSP 106 such that the provisioning transactions are captured and timely reported to the LIMS 108.

Figure 2:
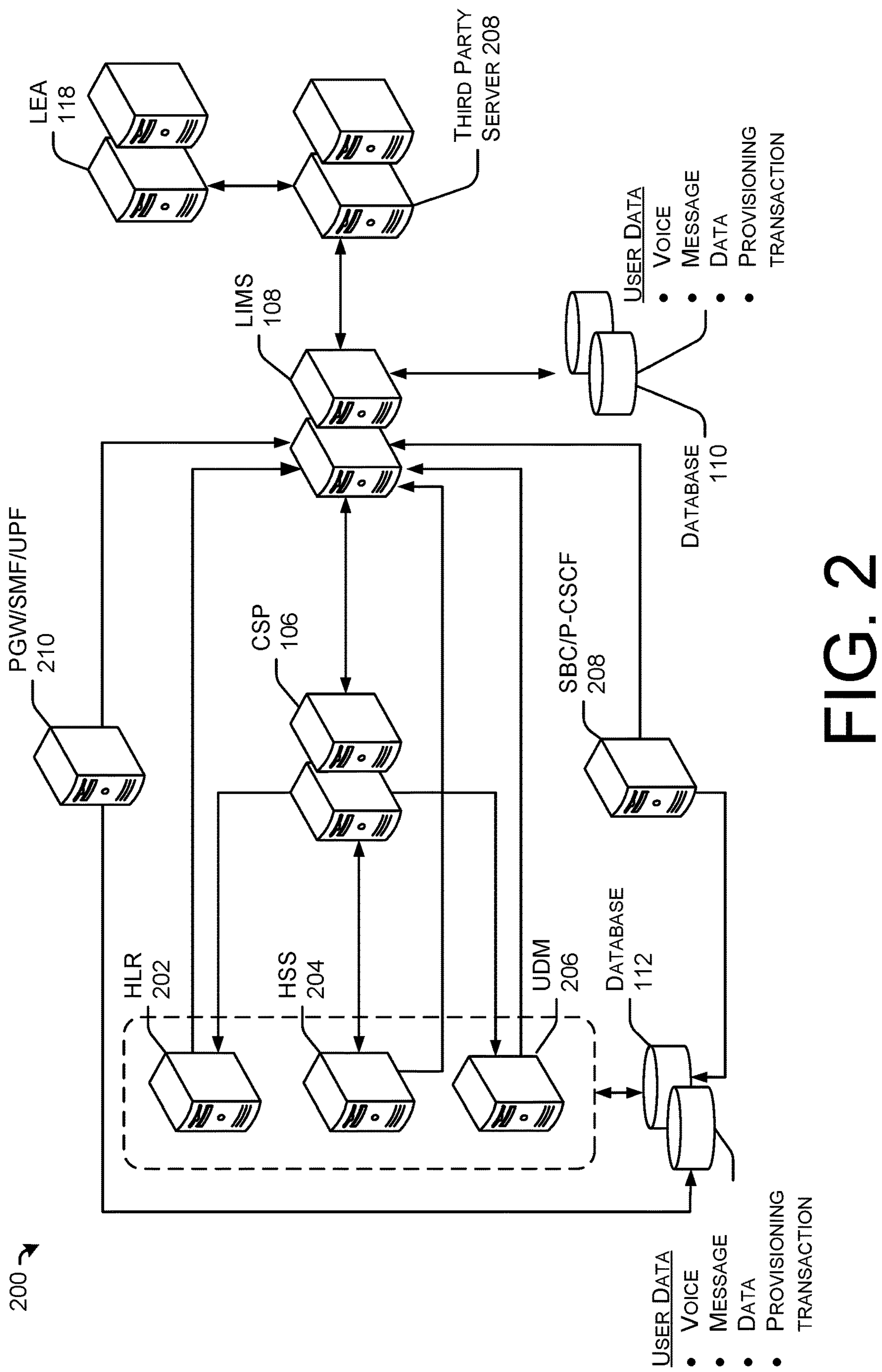
FIG. 2 illustrates an exemplary network scenario, in which methods for intercepting user activities are implemented according to an embodiment of the present disclosure.

FIG. 2 illustrates an exemplary network scenario, in which methods for intercepting user activities are implemented according to an embodiment of the present disclosure.

According to the scenario 200 as illustrated in FIG. 2, the LEA 118 may send a request to track a target subscriber through a third-party server 208 located in the second network 116. Upon receiving the request, the LIMS 108 forwards the request to the CSP 106. In implementations, the CSP 106 is configured to generate a provisioning request for the target subscriber and triage the provisioning request to various user data management systems corresponding to different radio access technologies. For example, a home location register (HLR) 202 is implemented to intercept the user activities occurred in 2G/3G network. In another example, a home subscriber server (HSS) 204 is implemented to detect the user activities occurred in 4G network. In yet another example, a unified data management (UDM) 206 is implemented to detect the user activities occurred in 5G network.

In some examples, the CSP 106 may be further configured to establish an interface between the CSP 106 and the respective data management systems (e.g., HLR 202, HSS 204, or UDM 206), enabling an immediate transmission of intercepted provisioning transactions from the respective data management systems to the CSP 106. For example, when a target subscriber with a given ISMI/MISISDN is requested to be tracked by the LEA 118, if there is no provisioning transaction during the tracking period, the LEA 118 is not notified. If there is a provisioning transaction during the tracking period, the data management system that intercepts the transaction transmits the information associated with the transaction immediately through the established interface to the CSP 106. The CSP 106 further forwards the information to the LIMS 108 to be shared with the LEA 118.

In some other examples, the CSP 106 may also establish an interface between the respective data management systems (e.g., HLR 202, HSS 204, or UDM 206) and the LIMS 108, enabling an immediate and direct transmission of intercepted provisioning transactions from the respective data management systems to the LIMS 108. When the target subscriber with the given IMSI/MISISDN is requested by the LEA 118 to be tracked, if there is a provisioning transaction during the tracking period, the data management system that intercepts the transaction transmits the information associated with the transaction directly through the established interface to the LIMS 108 to be shared with the LEA 118. For example, if a provisioning transaction is detected by the UDM 206, the information associated with the transaction is immediately transmitted to the LIMS 108 through the dedicated interface.

The scenario 200 as illustrated in FIG. 2 may also include a call session control server for LTE/IMS (IP multimedia subsystem) network, i.e., SBC (session border control)/P-CSCF (Proxy-Call Session Control Function) 208. The SBC/P-CSCF 208 is configured to handle the voice activities occurred in the VoLTE/IMS network. A voice call dialed in through LTE/IMS network can be detected at the SBC/P-CSCF 208 and the data related to the voice call is written to the database 112. The SBC/P-CSCF 208 may further forward the data related to the intercepted voice call to the LIMS 108 to be saved in the local database 110.

In some examples, the scenario 200 may further include a data service control server for 4G/5G network, i.e., PGW (PDN gateway)/SMF (session management function)/UPF (user plane function) 210. The PGW/SMF/UPF 210 is configured to intercept the data activities occurred in the 4G/5G network. Activities related to using data service through the 4G/5G network may be detected at the PGW/SMF/UPF 210 and forwarded to the LIMS 108. The information related to the data service activities is stored in database 112 and 110.

According to the scenario 200 as illustrated in FIG. 2, the provisioning transactions intercepted at one or more of the HLR 202, HSS 204, or UDM 206 are immediately reported to the LIMS 108 through the dedicated interfaces. The data related to the provisioning transactions are stored in the database 112 as well as in the database 110. As LIMS 108 is notified when the provisioning transactions are detected, data related to the provisioning transactions can be timely shared with the LEA 118. When a critical provisioning transaction (e.g., SIM card change) is intercepted, the LIMS 108 can identify the change promptly and generate a new request to track the target subscriber based on the change. The present disclosure provides solutions to prevent the target subscriber from being lost in tracking and therefore, can efficiently monitor a full span of the activities of the target subscriber in the network.

Figure 3:
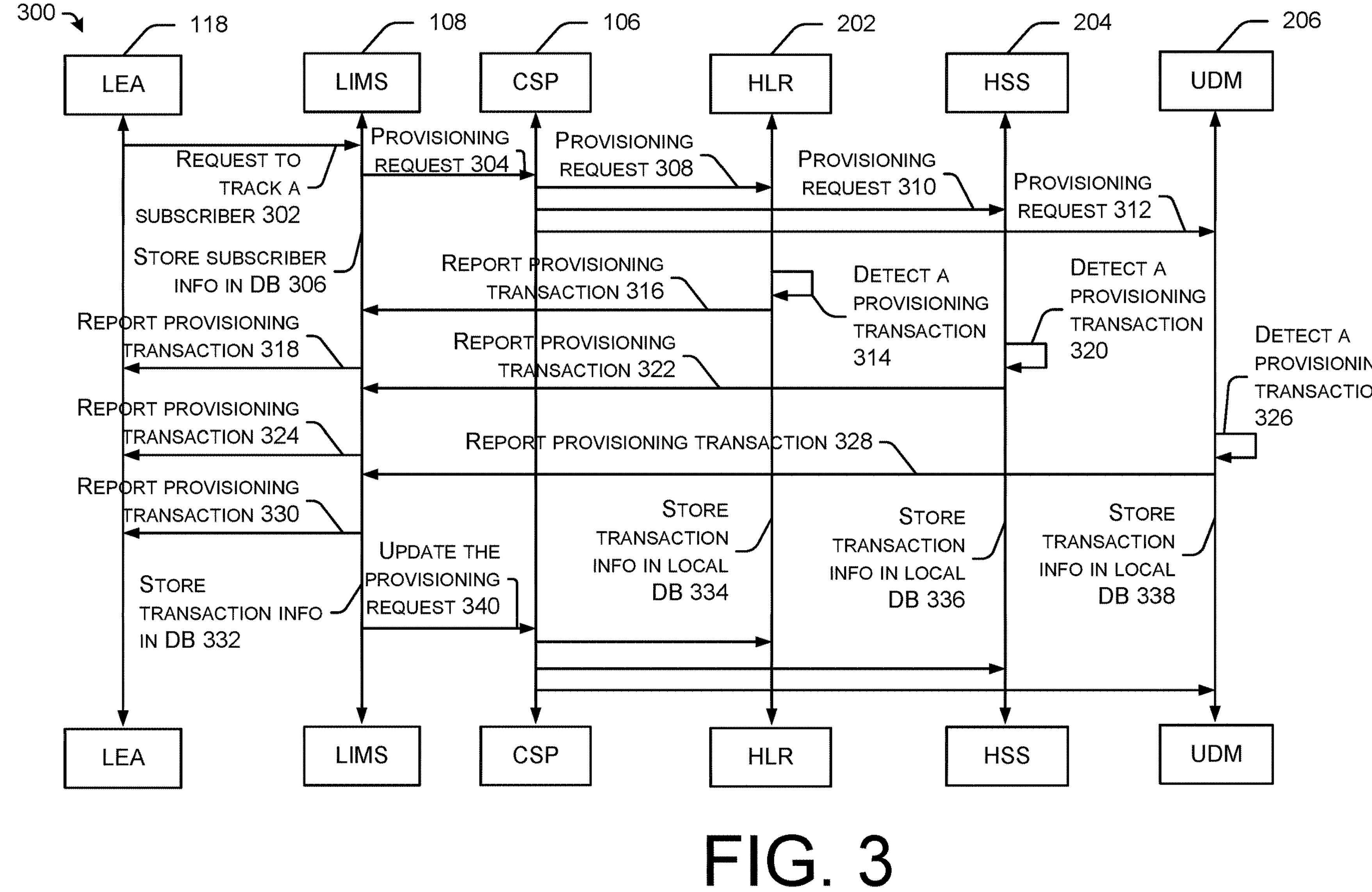
FIG. 3 illustrates an exemplary scenario for intercepting user activities according to an embodiment of the present disclosure.

FIG. 3 illustrates an exemplary scenario for intercepting user activities according to an embodiment of the present disclosure.

According to the scenario 300 as illustrated in FIG. 3, the LEA 118 may send a request to the LIMS 108 to track a target subscriber (at 302). In general, the request includes some identity information of the target subscriber such as, the SIM card information, the phone number, etc. Upon receiving the request, the LIMS 108 generates a provisioning request (at 304) and forward the provisioning request to the CSP 106. The provisioning request may include a request to notify the LIMS 108 any intercepted provisioning transactions of the target subscriber. The CSP 106, acting as a triage center, then forwards the provisioning request to one or more data management systems in the network (at 308).

In some examples, the network may be a telecommunication network that is compatible with a plurality of radio access technologies including but not limited to 2G, 3G, 4G, 4G/LTE, LTE/IMS, 5G, etc. Thus, the network (e.g., the first network 114 as shown in FIG. 1) includes a plurality of data management systems corresponding to different radio access technologies. The CSP 106 may forward the provisioning request to the HLR 202 (at 308), the HSS (at 310), and the UDM (at 312). If during the tracking period, the HLR 202 detects a provisioning transaction (at 314) performed through 2G/3G network, the HLR 202 reports the provisioning transaction to the LIMS 108 (at 316). The LIMS 108 further reports the provisioning transaction to the LEA 118 (at 318). In another example, if the HSS 204 detects provisioning transaction (at 320) performed through 4G network, the HSS 204 reports the provisioning transaction to the LIMS 108 (at 322). The LIMS 108 further reports the provisioning transaction to the LEA 118 (at 324). In yet another example, if the UDM 206 detects provisioning transaction (at 326) performed through 5G network, the UDM 206 reports the provisioning transaction to the LIMS 108 (at 328). The LIMS 108 further reports the provisioning transaction to the LEA 118 (at 330).

As discussed herein, the detected provisioning transactions are also stored in a local database communicatively connected to the HLR 202, HSS 204, AND UDM 206 (at 334, 336, and 338). The local database may be the database 112 shown in FIG. 1. The detected provisioning transactions are also saved by the LIMS 108 at its local database, e.g., database 110 of FIG. 1 (at 332).

Upon receiving the reported provisioning transaction, the LIMS 108 may determine whether it is a critical provisioning transaction that can affect the tracking of the target subscriber. For example, the reported provisioning transaction may be a change of the phone number or a change of the SIM card. User activities that are collected based on the initial phone number or SIM card number will no longer reflect the user activities in the network after the change takes effect. Therefore, the LIMS 108 determines it is a critical provisioning transaction. The LIMS 108 may then notify LEA and update the provisioning request based on the reported provisioning transaction (at 340) and re-send it to the HLR 202, HSS 204, and UDM 206.

In some examples, the CSP 106 may generate a respective interface between the LIMS 108 and the HLR 202, HSS 204, and UDM 206. The information related to the intercepted provisioning transactions can be immediately shared with the LIMS 108 via the respective interface.

In some examples, there is no request from the LEA 118 to track certain subscriber. During the no-tracking period, when one or more of the HLR 202, HSS 204, and UDM 206 intercepts a provisioning transaction, the information is also shared with the LIMS 108 promptly through the dedicated interface. The LIMS 108 stores the information in its local database. In some examples, the LIMS 108 may maintain a list of intercepted provisioning transactions. At a later time, when the LEA 118 sends a request to track a certain subscriber, the LIMS 108 may check the list of intercepted provisioning transactions. If there is a match between the subscriber and an intercepted provisioning transaction, the LIMS 108 may share such information with the LEA 118.

Although not shown in FIG. 3, the LIMS 108 may constantly receive the information related to signaling intercepted user activities from one or more of the computer servers associated with those services. For instance, the LIMS 108 may constantly receive the intercepted voice activities, text activities, and/or data service activities occurred in 4G/LTE and/or 5G networks from the SBC/P-CSCF 208 and/or the PGW/SMF/UPF 210. During a tracking period (i.e., there is a request to track a target user from the LEA 118), such information may be instantly shared with the LIMS 108 and shared with LEA 118. In some examples, when a provisioning transaction causing a change in the target subscriber's identity is notified to LIMS 108, an updated request associated with the new target subscriber identity may be generated by the LIMS 108. The updated request will then be forwarded to the SBC/P-CSCF 208 and/or the PGW/SMF/UPF 201 to intercept user activities according to the new target subscriber identity.

It should be appreciated that the network elements illustrated in FIGS. 1-3 are for illustrative purposes. The present disclosure is not intended to be limiting. Any user data management system and/or control system that are compatible with the existing and/or future radio access technologies can be implemented in the network to intercept user activities.

Figure 4:
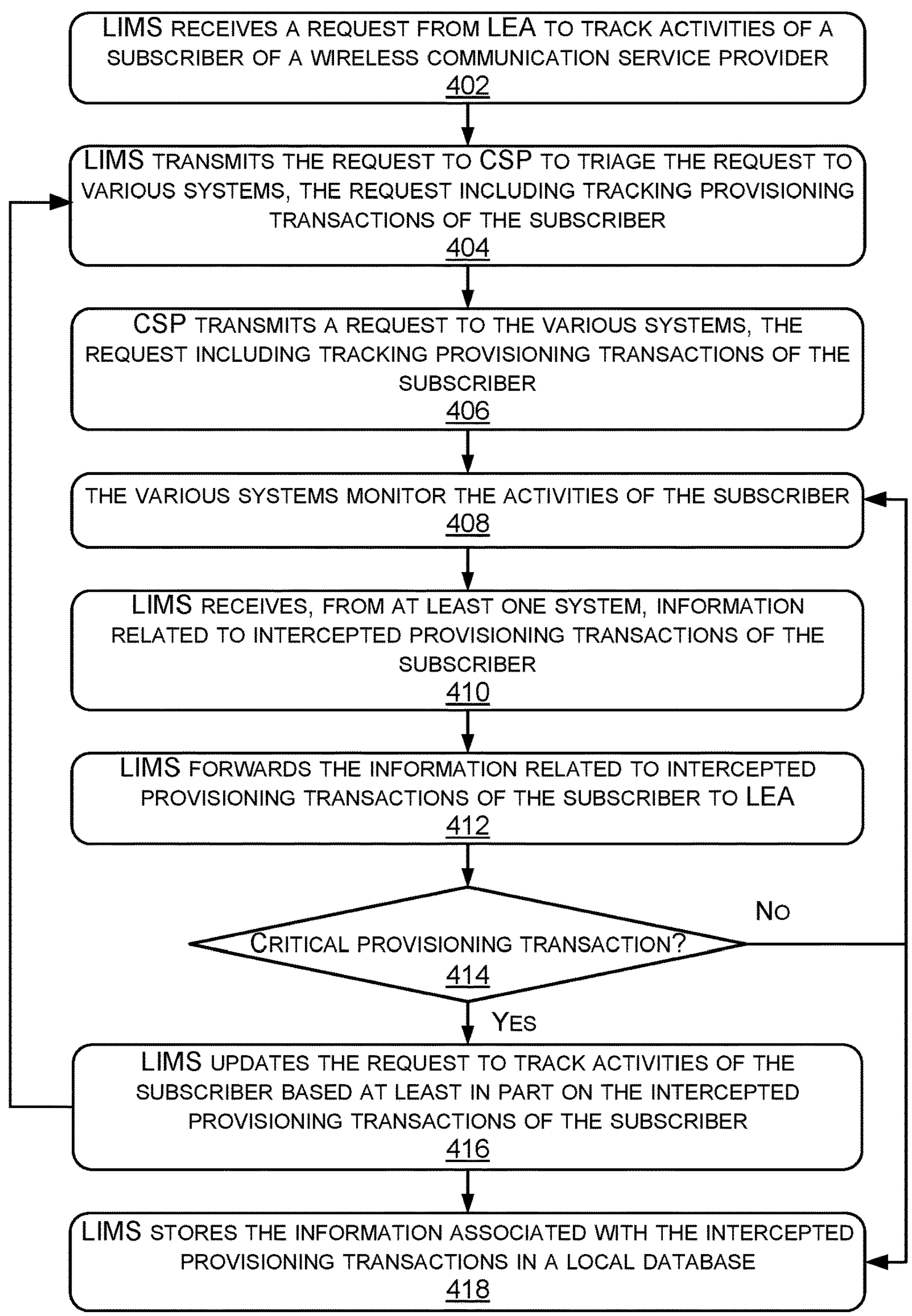
FIG. 4 illustrates an exemplary process for intercepting user activities according to an embodiment of the present disclosure.
Figure 5:
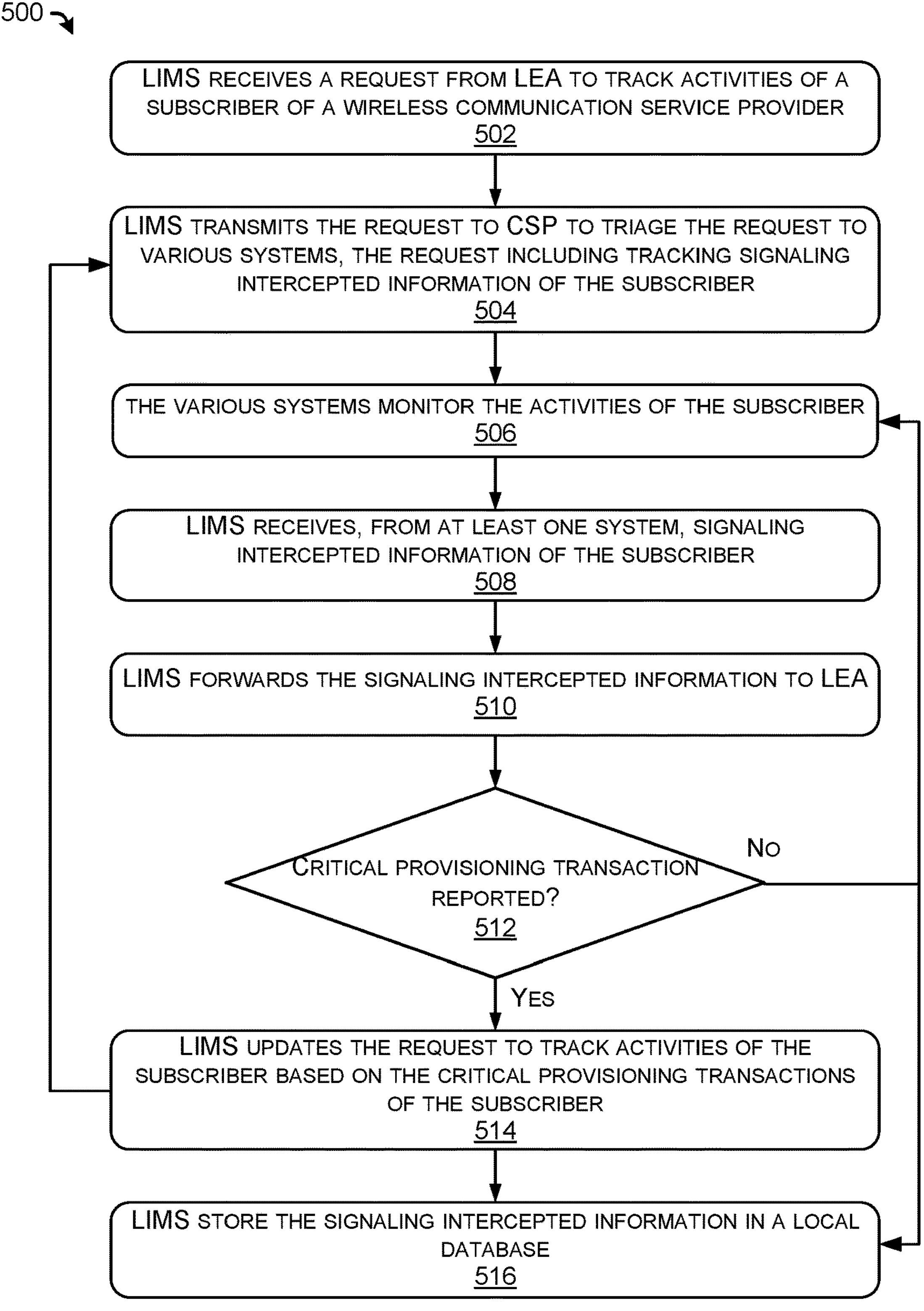
FIG. 5 illustrates another exemplary process for intercepting user activities according to an embodiment of the present disclosure.

FIGS. 4-5 illustrate various example processes for intercepting user activities according to the embodiments of the present disclosure. By way of example and without limitation, the processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined (or omitted) in any order and/or in parallel to implement the processes. In some examples, multiple branches represent alternate implementations that may be used separately or in combination with other operations discussed herein.

FIG. 4 illustrates an exemplary process for intercepting user activities according to an embodiment of the present disclosure. The process 400 as illustrated in FIG. 4 is directed to the flow of intercepting the user activities related to the provisioning transactions.

At operation 402, LIMS receives a request from LEA to track activities of a subscriber of a wireless communication service provider. In some examples, the LEA (e.g., LEA 118 shown in FIGS. 1-3) may send the request to track activities of a subscriber through a third-party server such as, Cognyte or SS8 server. In general, the request includes one or more identities associated with the subscriber. One identity may be the subscriber's phone number. Additionally or alternatively, the identity may be the SIM card number associated with the subscriber. In yet other examples, the identity may be the subscriber's name registered at the wireless communication service provider. The request may include any combination of one or more identities described above.

As discussed herein, the LEA may be located in a different network from where the LIMS is located. The third-party server may be located in a public telecommunication network to bridge the communication between the LEA and the LIMS. The data exchanged between the LEA and the LIMS may be encrypted for security purpose.

At operation 404, the LIMS transmits the request to CSP to triage the request to various systems, the request including tracking provisioning transactions of the subscriber. In some examples, the LIMS may transmit the request via an interface dedicated by the CSP (e.g., CSP 106 shown in FIGS. 1-3) for reporting the provisioning transactions.

At operation 406, the CSP transmits a request to the various systems, the request including tracking provisioning transactions of the subscriber. As discussed herein, the CSP may further dedicate an interface between the LIMS and the individual system that intercepts the provisioning transactions. The systems intercepting the provisioning transactions may include multiple servers compatible with multiple radio access technologies, respectively. For example, the multiple servers may include HLR compatible with 2G/3G network, HSS compatible with 4G network, UDM compatible with 5G network, etc. The CSP establishes the dedicated interface between the LIMS and each of the HLR, HSS, and UDM to facilitate the immediate reporting of the provisioning transactions.

At operation 408, the various systems monitor the activities of the subscriber. As discussed herein, the various systems can intercept the provisioning transactions of the subscriber in the network. In examples, the provisioning transactions are intercepted when the subscriber completes the provisioning transactions through his/her online account with the service provider using a mobile device. In another example, the provisioning transactions are intercepted when the subscriber completes the provisioning transactions through a phone call to the customer service. In yet another example, the provisioning transactions are intercepted when the subscriber completes the provisioning transactions through text messages to the customer service.

In some examples, the HLR (e.g., HLR 202 in FIGS. 2-3) may intercept the provisioning transactions if the user device (e.g., UE 120, 124 in FIG. 1) is connected through 2G/3G network. In another example, the HSS (e.g., HSS in FIGS. 2-3) may intercept the provisioning transactions if the user device is connected through 4G/LTE network. In yet another example, the UDM (e.g., UDM 206 in FIGS. 2-3) may intercept the provisioning transactions if the user device is connected through 5G network.

At operation 410, the LIMS receives, from at least one system, information related to intercepted provisioning transactions of the subscriber. As discussed herein, the information related to intercepted provisioning transactions are transmitted to the LIMS through the dedicated interface established by CSP.

At operation 412, LIMS forwards the information related to intercepted provisioning transactions of the subscriber to LEA. In some examples, the information related to intercepted provisioning transactions is transmitted through a third-party server located in the public network.

At operation 414, the LIMS may determine whether it is a critical provisioning transaction. As discussed herein, the critical transaction may change the subscriber's identity information, causing the initially targeted subscriber being lost in tracking. In some examples, the critical transaction may include IMSI (International Mobile Subscriber Identity) change and MSISDN (Mobile Station Integrated Services Digital Network) change. In some other examples, the critical transaction may also include activating a new subscriber, suspending a subscriber, restoring a suspended subscriber, deactivating a subscriber, sending cancel location to VLR (Visitor Location Register)/MME (Mobility Management Entity)/AMF (Access and Mobility Function), locking IMSI/IMEI (International Mobile Equipment Identity), unlocking IMSI/IMEI, etc.

As discussed herein, the LIMS may maintain a list of critical provisioning transactions in its local database. When a provisioning transaction is intercepted and reported, the LIMS checks the list and reports to the LEA if it is a critical provisioning transaction.

If it is determined that it is not a critical provisioning transactions, the operation returns to 408.

If it is determined that it is a critical provisioning transaction, at operation 416, LIMS updates the request to track activities of the subscriber based at least in part on the intercepted provisioning transactions of the subscriber. For example, if the critical provisioning transaction is IMSI change, LIMS updates the request to reflect the new SIM card information and transmits the updated request to CSP. The CSP may further forward the updated request to HLR, HSS, and UDM to intercept the transactions based on the new SIM card information and returns to operation 404. The updated request is also forwarded to SBC/P-CSCF 208 and/or the PGW/SMF/UPF 201 to intercept the voice activities, text activities, and/or data service activities in the 4G/LTE/5G networks.

At operation 418, the LIMS may store the information associated with the intercepted provisioning transactions in a local database.

FIG. 5 illustrates another exemplary process for intercepting user activities according to an embodiment of the present disclosure. The process 500 as illustrated in FIG. 5 is directed to the flow of intercepting the user activities related to the signaling related actives.

At operation 502, LIMS receives a request from LEA to track activities of a subscriber of a wireless communication service provider.

At operation 504, the LIMS transmits the request to CSP to triage the request to various systems, the request including tracking signaling intercepted activities of the subscriber. As discussed herein, signaling intercepted activities may include voice calls, text messages, and/or data services. These activities normally generate signaling intercepted information and can be captured at the access points of the wireless communication network.

At operation 506, the various systems may intercept the activities of the subscriber. In some examples, the various systems may include a VoLTE/4G related servers that can intercept the activities occurred in the VoLTE/IMS network. For example, an SBC/P-CSCF (e.g., SBC/P-CSCF 208) can be implemented to intercept the voice call, text messages, and data services occurred in the LTE/4G network. In another example, a PGW/SMF/UPF (e.g., PGW/SMF/UPF 210) can be implemented to intercept the voice call, text messages, and data services occurred in the 4G/5G network.

At operation 508, the LIMS may receive, from at least one system, signaling intercepted information of the subscriber. As discussed herein, the signaling intercepted information may be a voice call through the LTE/IMS network, a voice call through a 4G/5G network, a text message through the LTE/IMS network, a text message through the 4G/5G network, a data service through the LTE/IMS network, a data service through the 4G/5G network, etc. The signaling intercepted information may be forwarded directly from the SBC/P-CSCF and/or the PGW/SMF/UPF.

At operation 510, the LIMS forwards the signaling intercepted information the LEA in response to the request.

At operation 512, the LIMS may determine whether a critical provisioning transaction is reported. As discussed herein, the LIMS separately sends the request to track the provisioning transactions of the subscriber to HLR, HSS, and/or UDM. The LIMS is notified from time to time when a provisioning transaction is intercepted by one or more of the HLR, HSS, or UDM. The LIMS determines whether the reported provisioning transaction is a critical provisioning transaction. If there is no critical provisioning transaction being reported, the operation returns to 506.

If there is critical provisioning transaction being reported, at operation 514, the LIMS notifies the LEA and updates the request to track activities of the subscriber base on the critical provisioning transaction of the subscriber and returns to operation 504. In some examples, the LIMS updates the request to instruct the SBC/P-CSCF and/or the PGW/SMF/UPF to intercept the signaling relate activities based on the changes indicated in the critical provisioning transaction.

At operation 516, the LIMS stores the signaling intercepted information in a local database.

Figure 6:
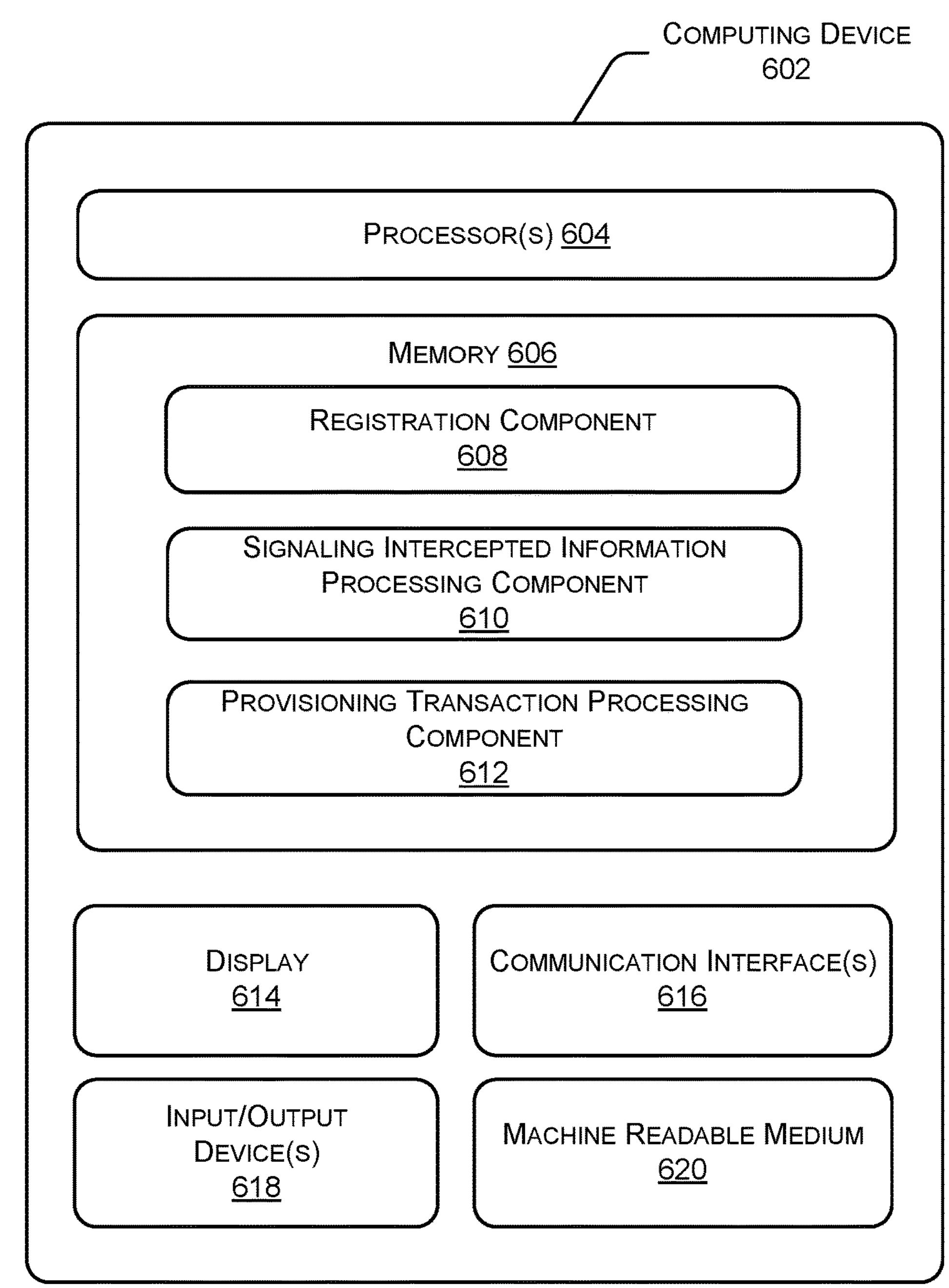
FIG. 6 illustrates an example computing device, in which provisioning transaction intercepting techniques are implemented according to an embodiment of the present disclosure.

FIG. 6 illustrates an example computing device, in which provisioning transaction intercepting techniques are implemented according to an embodiment of the present disclosure.

As shown, a computing device 602 may comprise processor(s) 604, a memory 606 storing a registration component 608, a signaling intercepted information processing component 610, and a provisioning transaction processing component 612, a display 614, communication interface(s) 616, input/output device(s) 618, and/or a machine readable medium 620.

In various examples, processor(s) 604 can be a central processing unit (CPU), a graphics processing unit (GPU), or both CPU and GPU, or any other type of processing unit. Each of the one or more processor(s) 604 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. Processor(s) 604 may also be responsible for executing all computer applications stored in memory 606, which can be associated with common types of volatile (RAM) and/or nonvolatile (ROM) memory.

In various examples, memory 606 can include system memory, which may be volatile (such as RAM), non-volatile (such as ROM, flash memory, etc.) or some combination of the two. Memory 606 can further include non-transitory computer-readable media, such as volatile and nonvolatile, removable and non-removable media implemented in any method or technology for storage of information, such as computer readable instructions, data structures, program components, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computing device 602. Any such non-transitory computer-readable media may be part of the computing device 602.

Registration component 608 may be configured to maintain user registration on computing device 602 (i.e., LIMS 108, as illustrated in FIGS. 1-3). The registration occurs when the user first registers his/her identity through a phone call, a text message, a website, and/or an app. The registration information may be saved on machine readable medium 620 and/or a remote storage. Signaling intercepted information processing component 610 may be configured to process the signaling intercepted information received from various access points of the network. In some examples, signaling intercepted information processing component 610 may forward the information related to phone calls, text messages, and data services to LIMS to be shared with LEA. In some other examples, signaling intercepted information processing component 610 may transmit the request to track a target subscriber to SBC/P-CSCF and/or PGW/SMF/UPF to intercept the signaling relate activities in the VoLTE/IMS/4G/5G networks. Provisioning transaction processing component 612 may be configured to process the provisioning transactions intercepted at various data management systems. In some examples, provisioning transaction processing component 612 may forward the intercepted provisioning transaction to LIMS to be shared with LEA. In some other examples, provisioning transaction processing component 612 may in response to a request from LEA, transmit the request to track a target subscriber to HLR, HSS, and/or UDM to intercept the provisioning transactions of the target subscriber.

The communication interface(s) 616 can include transceivers, modems, interfaces, antennas, and/or other components that perform or assist in exchanging radio frequency (RF) communications with base stations of the telecommunication network, a Wi-Fi access point, and/or otherwise implement connections with one or more networks. For example, the communication interface(s) 616 can be compatible with multiple radio access technologies, such as 5G radio access technologies and 4G/LTE radio access technologies. Accordingly, the communication interfaces 616 can allow the computing device 602 to connect to the 5G system described herein.

Display 614 can be a liquid crystal display or any other type of display commonly used in computing device 602. For example, display 614 may be a touch-sensitive display screen, and can then also act as an input device or keypad, such as for providing a soft-key keyboard, navigation buttons, or any other type of input. Input/output device(s) 618 can include any sort of output devices known in the art, such as display 614, speakers, a vibrating mechanism, and/or a tactile feedback mechanism. Input/output device(s) 618 can also include ports for one or more peripheral devices, such as headphones, peripheral speakers, and/or a peripheral display. Input/output device(s) 618 can include any sort of input devices known in the art. For example, input/output device(s) 618 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 620 can store one or more sets of instructions, such as software or firmware, that embodies any one or more of the methodologies or functions described herein. The instructions can also reside, completely or at least partially, within the memory 606, processor(s) 604, and/or communication interface(s) 616 during execution thereof by computing device 602. The memory 606 and the processor(s) 604 also can constitute machine readable media 620.

The various techniques described herein may be implemented in the context of computer-executable instructions or software, such as program components, that are stored in computer-readable storage and executed by the processor(s) of one or more computing devices such as those illustrated in the figures. Generally, program components include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method implemented on a lawful interception management system (LIMS) of a communication network, the method comprising:

receiving, from a law enforcement agency (LEA), a request to track activities of a subscriber of services provided through the communication network;

transmitting, via an interface, the request to a communication service provider (CSP), causing the CSP to act as a triage center that respectively forwards the request to one or more data management servers in the communication network corresponding to different radio access technologies, wherein the CSP establishes a respective dedicated interface between the LIMS and each of the one or more data management servers to facilitate immediate reporting of provisioning transactions;

receiving, from at least one of the CSP or the one or more data management servers via the respective dedicated interface, information associated with the activities of the subscriber, wherein the activities include provisioning transactions of the subscriber;

determining that the provisioning transactions include a critical provisioning transaction that changes identity information of the subscriber;

updating the request to track activities of the subscriber based at least in part on the critical provisioning transaction to reflect updated identity information of the subscriber;

transmitting the updated request to the CSP to be forwarded to the one or more data management servers in the communication network to track activities based on the updated identity information; and transmitting, to the LEA via the interface, the information associated with the activities of the subscriber.

2. The method of claim 1, wherein the request to track the activities of the subscriber is transmitted to the LIMS through a third-party server.

3. The method of claim 1, wherein one or more servers in the communication network include one or more of a home location register (HLR), a home subscriber server (HSS), or a unified data management (UDM), the method further comprising:

receiving, from at least one of the HLR, the HSS, or the UDM, the information identifying a provisioning transaction of the subscriber, and forwarding the information to the LEA through a third-party server.

4. The method of claim 1, wherein during a period when no request from the LEA is active for a particular subscriber, the one or more data management servers continue to intercept provisioning transactions and share information with the LIMS through the respective dedicated interfaces, and wherein the LIMS maintains a list of intercepted provisioning transactions such that when the LEA subsequently sends a request to track the particular subscriber, the LIMS checks the list and shares matching provisioning transaction information with the LEA.

5. The method of claim 1, further comprising:

transmitting the updated request to one or more signaling interception servers configured to intercept at least one of voice activities, text activities, or data service activities, wherein the one or more signaling interception servers intercept activities based on the updated identity information from the critical provisioning transaction.

6. The method of claim 1, wherein the information associated with the activities of the subscriber includes at least one of:

voice activities of the subscriber, or text activities of the subscriber.

7. The method of claim 6, wherein interface is configured to enable transmission of the provisioning transactions from the CSP or the one or more data management servers to the LIMS.

8. The method of claim 6, wherein the provisioning transactions further include at least one of:

changing international mobile subscriber identity (IMSI) of the subscriber, or changing mobile station integrated services digital network (MSISDN) of the subscriber.

9. A system comprising:

one or more processors, and one or more non-transitory memories storing instructions executed by the one or more processors to perform actions including:

receiving, from a law enforcement agency (LEA), a request to track activities of a subscriber of services provided through a communication network;

transmitting, via an interface, the request to a communication service provider (CSP), causing the CSP to act as a triage center that respectively forwards the request to one or more data management servers in the communication network corresponding to different radio access technologies, wherein the CSP establishes a respective dedicated interface between a lawful interception management system (LIMS) and each of the one or more data management servers to facilitate immediate reporting of provisioning transactions;

receiving, from at least one of the CSP or the one or more data management servers via the respective dedicated interface, information associated with the activities of the subscriber, wherein the activities include provisioning transactions of the subscriber;

determining that the provisioning transactions include a critical provisioning transaction that affects tracking of the subscriber;

updating the request to track activities of the subscriber based at least in part on the critical provisioning transaction to reflect changes indicated in the critical provisioning transaction;

transmitting the updated request to the CSP to be forwarded to the one or more data management servers in the communication network to track activities based on the changes indicated in the critical provisioning transaction; and transmitting, to the LEA via the interface, the information associated with the activities of the subscriber.

10. The system of claim 9, wherein the request to track the activities of the subscriber is transmitted to the LIMS through a third-party server.

11. The system of claim 9, wherein the information associated with the activities of the subscriber includes at least one of:

voice activities of the subscriber, text activities of the subscriber, or data activities of the subscriber.

12. The system of claim 9, wherein during a period when no request from the LEA is active for a particular subscriber, the one or more data management servers continue to intercept provisioning transactions and share information with the LIMS through the respective dedicated interfaces, and wherein the LIMS maintains a list of intercepted provisioning transactions such that when the LEA subsequently sends a request to track the particular subscriber, the LIMS checks the list and shares matching provisioning transaction information with the LEA.

13. The system of claim 9, further comprising:

one or more signaling interception servers configured to intercept at least one of voice activities, text activities, or data service activities, wherein the updated request is transmitted to the one or more signaling interception servers to intercept activities based on the changes indicated in the critical provisioning transaction.

14. The system of claim 11, wherein one or more servers in the communication network include one or more of a home location register (HLR), a home subscriber server (HSS), or a unified data management (UDM), wherein the actions further comprise:

receiving, from at least one of the HLR, the HSS, or the UDM, the information identifying a provisioning transaction of the subscriber, and forwarding the information to the LEA through a third-party server.

15. The system of claim 11, wherein the interface is configured to enable transmission of the provisioning transactions from the CSP or the one or more data management servers to the LIMS.

16. The system of claim 11, wherein the provisioning transactions include at least one of:

changing international mobile subscriber identity (IMSI) of the subscriber, or changing mobile station integrated services digital network (MSISDN) of the subscriber.

17. One or more non-transitory computer-readable storage medium storing computer-readable instructions, that when executed by one or more processors, cause the one or more processors to perform actions comprising:

receiving, from a law enforcement agency (LEA), a request to track activities of a subscriber of services provided through a communication network;

transmitting, via an interface, the request to a communication service provider (CSP), causing the CSP to act as a triage center that respectively forwards the request to one or more data management servers in the communication network corresponding to different radio access technologies, wherein the CSP establishes a respective dedicated interface between a lawful interception management system (LIMS) and each of the one or more data management servers to facilitate immediate reporting of provisioning transactions;

receiving, from at least one of the CSP or the one or more data management servers via the respective dedicated interface, information associated with the activities of the subscriber, wherein the activities include provisioning transactions of the subscriber;

determining that the provisioning transactions include a critical provisioning transaction that changes identity information of the subscriber;

updating the request to track activities of the subscriber based at least in part on the critical provisioning transaction to reflect updated identity information of the subscriber;

transmitting the updated request to the CSP to be forwarded to the one or more data management servers in the communication network to track activities based on the updated identity information; and transmitting, to the LEA via the interface, the information associated with the activities of the subscriber.

18. The one or more non-transitory computer-readable storage medium of claim 17, wherein one or more servers in the communication network include one or more of a home location register (HLR), a home subscriber server (HSS), or a unified data management (UDM), wherein the actions further comprise:

receiving, from at least one of the HLR, the HSS, or the UDM, the information identifying a provisioning transaction of the subscriber, and forwarding the information to the LEA through a third-party server.

19. The one or more non-transitory computer-readable storage medium of claim 17, the information associated with the activities of the subscriber includes at least one of:

voice activities of the subscriber, text activities of the subscriber, data activities of the subscriber.

20. The one or more non-transitory computer-readable storage medium of claim 17, wherein the actions further comprise:

transmitting the updated request to one or more signaling interception servers configured to intercept at least one of voice activities, text activities, or data service activities, wherein the one or more signaling interception servers intercept activities based on the updated identity information from the critical provisioning transaction.

* * * * *